(12) United States Patent
Jenaro Rabadan (10) Patent No.: US 10,597,142 B2
(45) Date of Patent: Mar. 24, 2020

(54) ACTIVE FLOW CONTROL DEVICES FOR AIRCRAFT WINGS

(71) Applicant: Airbus Operations GmbH, Hamburg (DE)

(72) Inventor: Guillermo Jenaro Rabadan, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 440 days.

(21) Appl. No.: 15/622,307

(22) Filed: Jun. 14, 2017

(65) Prior Publication Data

US 2017/0361918 A1    Dec. 21, 2017

(30) Foreign Application Priority Data

Jun. 17, 2016  (EP) ..................................... 16174923

(51) Int. Cl.
| | | |
|---|---|---|
| *B64C 9/24* | (2006.01) | |
| *B64C 21/08* | (2006.01) | |
| *B64C 21/04* | (2006.01) | |
| *B64C 9/18* | (2006.01) | |
| *B64D 45/00* | (2006.01) | |
| *B64C 9/14* | (2006.01) | |

(52) U.S. Cl.
CPC .................. *B64C 9/24* (2013.01); *B64C 9/18* (2013.01); *B64C 21/04* (2013.01); *B64C 21/08* (2013.01); *B64D 45/00* (2013.01); *B64C 2009/143* (2013.01); *B64D 2045/0085* (2013.01)

(58) Field of Classification Search
CPC .. B64C 9/24; B64C 9/18; B64C 21/04; B64C 21/08; B64C 2009/143; B64D 45/00; B64D 2045/0085
See application file for complete search history.

(56) References Cited

U.S. PATENT DOCUMENTS

| | | |
|---|---|---|
| 3,917,193 A | 11/1975 | Runnels, Jr. |
| 8,336,828 B2 | 12/2012 | Shmilovich et al. |

(Continued)

FOREIGN PATENT DOCUMENTS

| | | |
|---|---|---|
| WO | 2005113336 | 12/2005 |
| WO | 2011076427 | 6/2011 |

OTHER PUBLICATIONS

European Search Report, dated Nov. 23, 2016, priority document.
"Starlet Project" of Janusz Sznajder et al, 2015.

*Primary Examiner* — Rodney A Bonnette
(74) *Attorney, Agent, or Firm* — Greer, Burns & Crain, Ltd.

(57) ABSTRACT

An aircraft wing incorporating an active flow control (AFC) device The AFC device comprises a fluid chamber housed in the wing providing a conduit for receiving fluid and accommodating the fluid at elevated pressure. Forward and rearward fluid channels having respective inlets and outlets are also provided, wherein the inlets are in fluid communication with the fluid chamber and the outlets emerge on the upper surface of the wing at or adjacent the leading edge. A valve assembly allows the channels to be opened and closed as desired. During flight, fluid at elevated pressure can be supplied to the fluid chamber and released through either the forward or the rearward fluid channel or both, so as to influence the air flow, e.g., to reduce or increase lift, or to equalize pressure in the air stream direction.

11 Claims, 8 Drawing Sheets

(56) References Cited

U.S. PATENT DOCUMENTS

| | | |
|---|---|---|
| 8,382,043 B1 | 2/2013 | Raghu |
| 9,108,725 B1 * | 8/2015 | Shmilovich ............. B64C 21/04 |
| 9,120,563 B2 | 9/2015 | Raghu |
| 2007/0221788 A1 | 9/2007 | Meister |
| 2009/0108125 A1 * | 4/2009 | Shmilovich ............... B64C 9/38 |
| | | 244/15 |
| 2013/0035808 A1 | 2/2013 | Goelling et al. |
| 2013/0284273 A1 | 10/2013 | Boespflug et al. |

* cited by examiner

ACTIVE FLOW CONTROL DEVICES FOR AIRCRAFT WINGS

CROSS-REFERENCES TO RELATED APPLICATIONS

This application claims the benefit of the European patent application No. 16174923.9 filed on Jun. 17, 2016, the entire disclosures of which are incorporated herein by way of reference.

FIELD OF THE INVENTION

The present invention relates to active flow control devices for aircraft wings.

BACKGROUND OF THE INVENTION

Temporary excessive lift in the outer wing portions of an aircraft wing can occur as a result of gusts of wind or an extreme maneuver. Short term excessive lift of this kind can create a high bending moment on the structure of the wing, especially at the wing root where the wing meets the fuselage. Temporary load alleviation can be undertaken to reduce this excessive lift when needed. A known measure to achieve this is by lifting the ailerons or spoilers. The provision of active flow control devices for this purpose has also recently been suggested.

SUMMARY OF THE INVENTION

According to a first aspect of the invention, there is provided an aircraft wing having an upper surface, a lower surface, a leading edge and a trailing edge, the wing incorporating an active flow control device comprising: a fluid chamber housed in the wing providing a conduit for receiving fluid and accommodating the fluid at elevated pressure; and a fluid channel having an inlet in fluid communication with the fluid chamber and an outlet on the upper surface of the wing arranged at or adjacent the leading edge, so that during flight, fluid at elevated pressure can be supplied to the fluid chamber and released through the fluid channel, so as to reduce lift.

A related aspect of the invention is the active flow control device of the first aspect of the invention. That is, an active flow control device comprising: a fluid chamber capable of being housed in the wing so as to provide a conduit for receiving fluid and accommodating the fluid at elevated pressure; and a fluid channel having an inlet in fluid communication with the fluid chamber and an outlet capable of being installed so as to emerge on the upper surface of the wing, wherein the active flow control device is adapted to be arrangeable at or adjacent the leading edge of a wing, so that during flight, fluid at elevated pressure can be supplied to the fluid chamber and released through the fluid channel, so as to reduce lift.

The fluid channel in some embodiments is arranged so that in flight it releases fluid in a direction having a substantial component in a counter-streamwise direction, i.e., against the predominant air flow direction. The fluid channel in some embodiments is arranged so that in flight it releases fluid in a direction having a substantial component transverse to the counter streamwise direction, i.e., upwards into the air flow. The fluid channel in some embodiments is arranged so that in flight it releases fluid in a direction having a substantial component in a streamwise direction, i.e., along the predominant air flow direction. By substantial component with respect to a certain direction, we mean at least one of: 30, 40, 50, 60 or 70 percent in that direction. It is therefore possible for fluid to be released having a substantial component in both the counter-streamwise and upward directions, or both the upward and streamwise directions.

The active flow control device may further comprise a valve assembly switchable to enable or block fluid communication between the fluid chamber and the fluid channel In one implementation, the fluid channel is a first fluid channel and the active flow control device further comprises a second fluid channel having an inlet in fluid communication with the fluid chamber and an outlet on the upper surface of the wing arranged at or adjacent the leading edge and aft of the outlet of the first fluid channel, and wherein the valve assembly is switchable between a first state in which fluid communication between the fluid chamber and the first fluid channel is enabled and fluid communication between the fluid chamber and the second fluid channel is blocked and a second state in which fluid communication between the fluid chamber and the second fluid channel is enabled and fluid communication between the fluid chamber and the first fluid channel is blocked, so that during flight, fluid at elevated pressure can be selectively released through either the first fluid channel or the second fluid channel.

In some embodiments, the valve assembly additionally is switchable to a further state in which fluid communication between the fluid chamber and both of the first and second fluid channels is blocked. In some embodiments, the valve assembly additionally is switchable to a still further state in which fluid communication between the fluid chamber and both of the first and second fluid channels is enabled.

In different embodiments, the active flow control device can be incorporated in the slat or in the main wing part. Regarding the position of the active flow control device on the wing, the wing's leading and trailing edges are defined as being separated along any given line in the stream direction by a chord length. Within this context, the above reference to "at or adjacent the leading edge" shall mean within at least one of 5, 10, 15, 20, 25 or 30 percent of the chord length, as taken from the leading edge.

A pair of aircraft wings incorporating active flow control devices according to the first aspect of the invention may be part of an aircraft which includes a control system for actuating the active flow control devices. The control system comprises: a controller hosting a control program operable to detect extreme events; and a plurality of sensors operatively connected to the controller to supply time-varying sensed parameter values to the controller. The control system is operable to detect extreme events based on analysis of the time-varying sensed parameter values and wherein, upon detection of an extreme event, the controller is operable to actuate the active flow control devices by causing fluid at elevated pressure to be supplied to the fluid chambers and released through the fluid channels, so as to reduce lift. Angle of attack may be an intermediate parameter calculated by the control system from the sensor data which is used exclusively or in combination with other parameters to predict an extreme event. Another related aspect of the invention is a method of controlling flight of an aircraft employing the control system just described.

According to a second aspect of the invention, there is provided an aircraft wing having an upper surface, a lower surface, a leading edge and a trailing edge, the wing incorporating an active flow control device comprising: a fluid chamber housed in the wing providing a conduit for receiving fluid and accommodating the fluid at elevated pressure;

a first fluid channel having an inlet in fluid communication with the fluid chamber and an outlet on the upper surface of the wing, so that during flight, fluid at elevated pressure can be supplied to the fluid chamber and released through the fluid channel, so as to reduce lift; a second fluid channel having an inlet in fluid communication with the fluid chamber and an outlet on the upper surface of the wing structure arranged aft of the outlet of the first fluid channel; and a valve assembly switchable between a first state in which fluid communication between the fluid chamber and the first fluid channel is enabled and fluid communication between the fluid chamber and the second fluid channel is blocked and a second state in which fluid communication between the fluid chamber and the second fluid channel is enabled and fluid communication between the fluid chamber and the first fluid channel is blocked, so that during flight, fluid at elevated pressure can be selectively released through either the first fluid channel or the second fluid channel.

A related aspect of the invention is the active flow control device of the second aspect of the invention. That is an active flow control device comprising: a fluid chamber capable of being housed in a wing to provide a conduit for receiving fluid and accommodating the fluid at elevated pressure; a first fluid channel having an inlet in fluid communication with the fluid chamber and an outlet capable of being installed so as to emerge on the upper surface of the wing, so that during flight, fluid at elevated pressure can be supplied to the fluid chamber and released through the fluid channel, so as to reduce lift; a second fluid channel having an inlet in fluid communication with the fluid chamber and an outlet capable of being installed to emerge on the upper surface of the wing structure arranged aft of the outlet of the first fluid channel; and a valve assembly switchable between a first state in which fluid communication between the fluid chamber and the first fluid channel is enabled and fluid communication between the fluid chamber and the second fluid channel is blocked and a second state in which fluid communication between the fluid chamber and the second fluid channel is enabled and fluid communication between the fluid chamber and the first fluid channel is blocked, so that during flight, fluid at elevated pressure can be selectively released through either the first fluid channel or the second fluid channel.

The first fluid channel, in some embodiments, is arranged so that in flight it releases fluid in a direction having a substantial component in a counter-streamwise direction, i.e., against the predominant air flow direction. The first fluid channel, in some embodiments, is arranged so that in flight it releases fluid in a direction having a substantial component transverse to the counter streamwise direction, i.e., upwards into the air flow. The second fluid channel, in some embodiments, is arranged so that in flight it releases fluid in a direction having a substantial component in a streamwise direction, i.e., along or with the predominant air flow direction. The second fluid channel, in some embodiments, is arranged so that in flight it releases fluid in a direction having a substantial component transverse to the counter streamwise direction, i.e., upwards into the air flow. By substantial component with respect to a certain direction, we mean at least one of: 30, 40, 50, 60 or 70 percent in that direction. It is therefore possible for fluid to be released from the first fluid channel having a substantial component in both the counter-streamwise and upward directions, and from the second fluid channel in both the upward and streamwise directions.

In some embodiments, the valve assembly additionally is switchable to a further state in which fluid communication between the fluid chamber and both of the first and second fluid channels is blocked. In some embodiments, the valve assembly additionally is switchable to a still further state in which fluid communication between the fluid chamber and both of the first and second fluid channels is enabled.

In different embodiments, the active flow control device can be incorporated in the slat, in the main wing part or in the flap.

A pair of aircraft wings incorporating active flow control devices according to the second aspect of the invention may be part of an aircraft which includes a control system for actuating the active flow control devices. The control system comprises: a controller hosting a control program operable to detect extreme events; and a plurality of sensors operatively connected to the controller to supply time-varying sensed parameter values to the controller, wherein the controller is operable to actuate the active flow control devices by causing fluid at elevated pressure to be supplied to the fluid chambers and released through at least one of the first fluid channels and the second fluid channels. Another related aspect of the invention is a method of controlling flight of an aircraft employing the control system just described.

BRIEF DESCRIPTION OF THE DRAWINGS

In the following, the present invention will further be described by way of example only with reference to exemplary embodiments illustrated in the figures.

DETAILED DESCRIPTION OF THE PREFERRED EMBODIMENTS

In the following detailed description, for purposes of explanation and not limitation, specific details are set forth in order to provide a better understanding of the present invention. It will be apparent to one skilled in the art that the present invention may be practiced in other embodiments that depart from these specific details.

Figure 1:
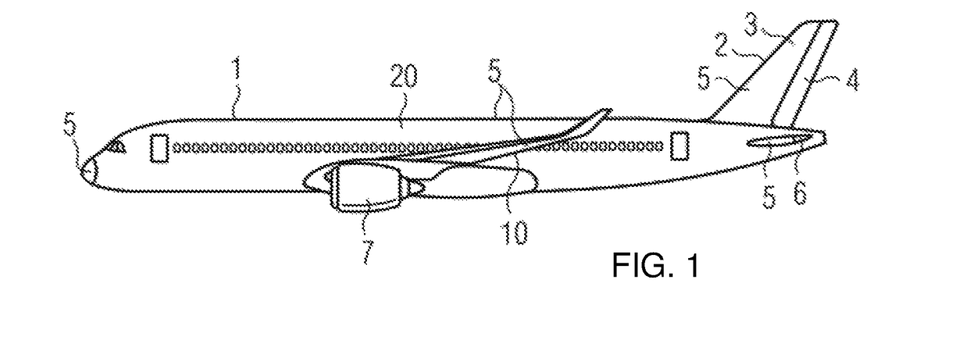
FIG. 1 is a schematic side view of an aircraft.

FIG. 1 is a schematic side view of an aircraft 1 with wings 10, a fuselage 20, a tail 2 with vertical stabilizer 3 and rudder 4, a horizontal stabilizer 5 with elevator 6 and engines 7. The aircraft is also equipped with a number of sensors S which can be located around the aircraft externally, e.g., at the nose, on the fuselage, on the wings or in the tail, or which can be located internally. For the present invention, we are principally interested in sensors that contribute to the aircraft's control system being able to detect gusts of wind or extreme maneuvers, for example though calculation of the aircraft's angle of attack (AoA). The sensors we are interested in thus include sensors to measure parameters such as: wind speed, temperature, pressure, altitude, aircraft pitch, yaw and roll. The sensors may have various designs, such as a pivot vane, a null-seeking pressure sensor or a differential pressure sensor.

Figure 2:
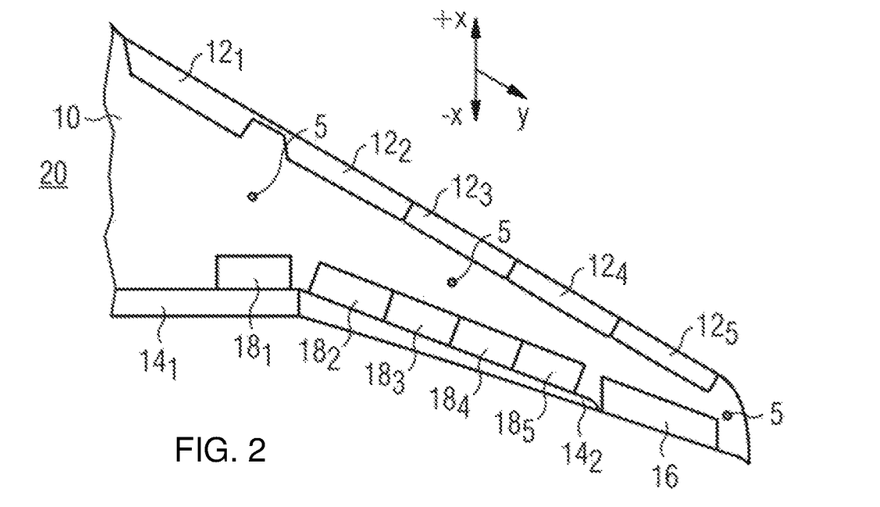
FIG. 2 is a schematic plan view of an aircraft wing.

FIG. 2 is a schematic plan view of an aircraft wing 10. The directions relative to the wing are shown with the axes as the flight direction +x, stream direction −x, and span direction y. The wing 10 is attached to the fuselage 20 at the wing root. At the leading edge of the wing 10, there are located a number of slats 12n. The slats 12n have an extended position for take-off and landing for increasing lift as well as a retracted position for normal flight. At the trailing edge of the wing 10, there are located a number of flaps 14n. The flaps 14n have an extended position for take-off and landing for increasing lift as well as a retracted position for normal flight. Towards the wing tip at the trailing edge there is provided an aileron 16 used to maneuver the aircraft. Adjacent the trailing edge there is also provided a number of spoilers 18n which can be raised in order to decrease lift and/or increase drag.

Figure 3:
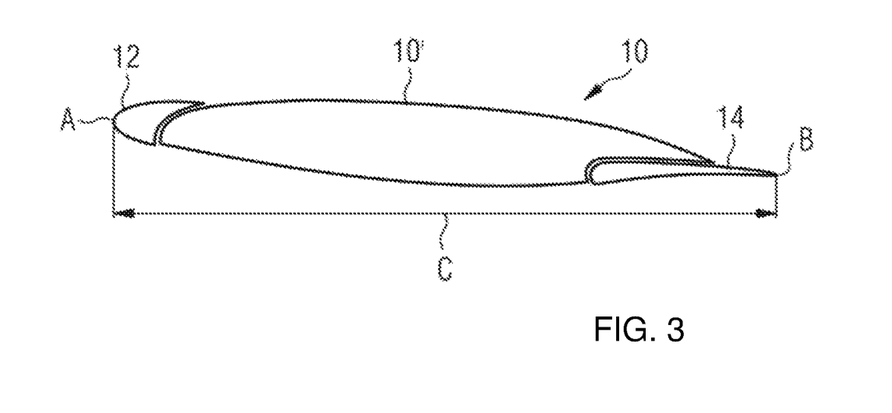
FIG. 3 is a simplified schematic section through an aircraft wing.

FIG. 3 is a simplified schematic section through an aircraft wing 10 showing an example slat 12 and flap 14 in a retracted position in relation to the main wing part 10'. The leading edge is indicated with an A, the trailing edge with a B and the chord length of the wing with a C.

Figure 4A:
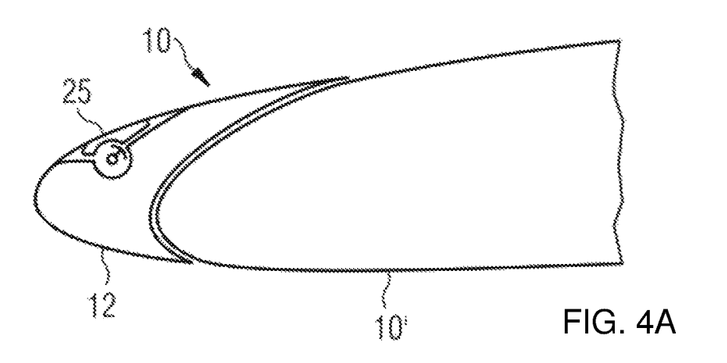
FIG. 4A is a partial section through an aircraft wing showing aspects of the mechanical structure of an active flow control device according to a first embodiment of the invention.
Figure 4B:
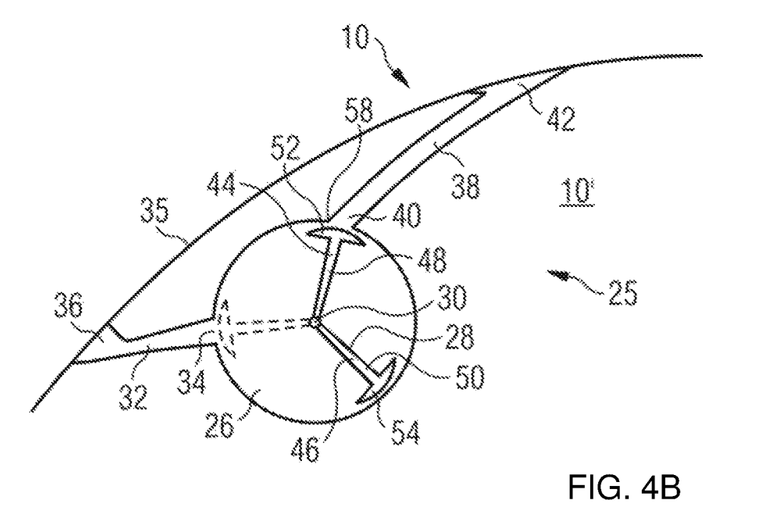
FIG. 4B is an enlargement of a portion of FIG. 4A.

FIG. 4A is a partial section through an aircraft wing 10 showing mechanical structure of an active flow control (AFC) device 25 according to a first embodiment of the invention mounted in a slat 12. FIG. 4B is an enlargement of a portion of FIG. 4A. The AFC device 25 comprises a fluid chamber 26 of circular cross-section which is elongate in the span direction, a valve assembly 28 rotatably mounted on a spindle 30 extending in the span direction, a forward outlet channel 32 leading from a forward inlet port 34 at the chamber 26 to a forward outlet port 36 on the slat surface 35, and a rearward outlet channel 38 leading from a rearward inlet port 40 at the chamber 26 to a rearward outlet port 42 on the slat surface and aft of the forward outlet port 36.

The valve assembly 28 comprises a first valve 44 and a second valve 46 which are arranged at an angle to each other as viewed in a plane perpendicular to an axis containing the spindle 30. The first and second valves 44 and 46 are mounted to co-rotate about the axis of the spindle 30 driven by the spindle 30. Each valve 44, 46 has a similar construction with a mushroom shaped cross-section comprising a stalk or stem 48, 50 and a cup 52, 54. Each cup 52, 54 has a distal valve surface which is shaped and dimensioned to form a fluidic seal with corresponding valve seats 56, 58 located at the rims of inlet ports 34, 40, thereby adopting a closed position in which fluid flow from the chamber to the respective channel is blocked. By contrast, when the channel inlet is not obscured by a valve, an opened position is adopted in which fluid flow from the chamber to the respective channel is unimpeded, i.e., enabled. As schematically illustrated in FIG. 4B, the valves 44, 46 are arranged at an approximately 120 degree angle to each other, as are the inlet ports 34, 40. This is so that the valves 44, 46 can be rotated in 120 degree increments to: block both inlet ports; open the forward inlet port 34 and close the rearward inlet port 40; or close the forward inlet port 34 and open the rearward inlet port 40. The dotted outline of a valve at the forward inlet port 34 is shown to indicate rotation of the valve assembly 28 so that the first valve 44 is arranged at that position while the second valve 46 is blocking the rearward inlet port 40.

The AFC device 25 therefore has two principal modes of operation defined by the valve positions, a forward mode in which fluid is ejected from the forward outlet channel 32 and a rearward mode in which fluid is ejected from the rearward outlet channel 38. The role of the forward mode is to disrupt laminar fluid flow over the wing at or near the leading edge. The additional fluid flow provided in the forward mode acts against the general fluid flow over the wing and thereby will act to increase the adverse pressure gradient and act to induce local separation. Consequently, if a gust is detected at the nose of the aircraft in advance of it arriving at the wings, then the forward mode can be activated before the gust arrives at the wing. Then, when the gust does arrive at the wing, a reduction of the load is effected, or equivalently an inboard displacement of the center of lift is achieved, compared with the situation in which the forward mode was not active. The role of the rearward mode is to condition air flow over the wing, for example by exploiting the Coanda effect so that the air flow hugs the wing more closely and increases lift. The rearward mode may therefore be suitable for take-off and landing. The rearward mode may also have sub-modes defined by how the fluid flow is output in combination with other states of the flight components and flight control. For example, another role of the rearward mode may be to condition air flow during normal cruising flight to reduce drag.

It is also possible for both forward and rearward channels to be open or both closed, which may be viewed as two additional modes of operation. When both the forward and rearward channels are closed, we refer to this as a stowed or inactive mode. When both the forward and rearward channels are open, we refer to this as a combined mode. The combined mode may be exploited as a useful in flight mode, since, when both ports are open and there is no fluidic actuation, i.e., there is an absence of compressed fluid supply to the fluid chamber 26, then the AFC device will have the effect of equalizing the pressures in the stream direction between the front and rear outlet ports 36 and 42. If the AFC device is mounted at or near the leading edge, this will therefore also change the pressure distribution in the region of the leading edge. The combined mode may also be exploited with fluidic actuation, which may provide more disruption to the airflow than the forward mode depending on the circumstances. In other words, the combined mode has two sub-modes with and without fluidic actuation.

A further set of operational modes can be envisaged when the AFC devices of left and right wings are operated in tandem for controlling the aircraft, for example during turns. In this further set of operational modes, there is a different setting for the AFC devices on either wing of a pair of wings. For example, banking may be facilitated with the AFC device(s) on one wing operating in the forward mode and the AFC device(s) on the other wing operating in rearward mode, or inactive mode.

Figure 4C:
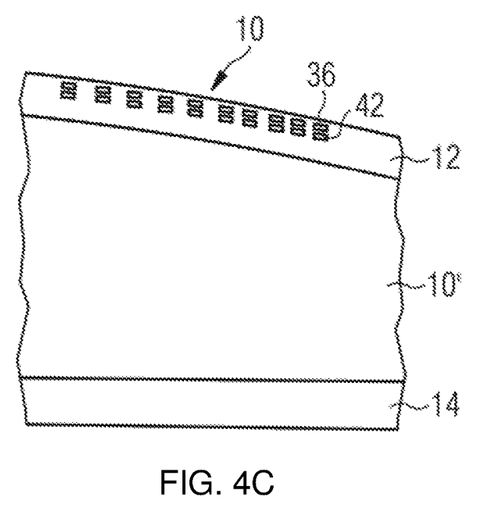
FIG. 4C is a partial plan view onto the wing of FIG. 4A.

FIG. 4C is a partial plan view onto the wing 10 of FIG. 4A showing the slat 12 and also a flap 14. In the slat 12 two lines of ports are visible, ten ports per line being illustrated by way of example. Namely, there is a line of the forward outlet ports 36 and a line of the rearward outlet ports 42.

From this view, it is clear that the chamber 26 is elongate in the span direction, for example cylindrical with a single diameter, or tapering in either the spanwise or the counter-span direction, or having varying diameter such that the diameter at each pair of ports is different from the diameter or other internal cross-sectional shape dimension at spanwise length portions which interconnect each pair of ports.

Figure 5:
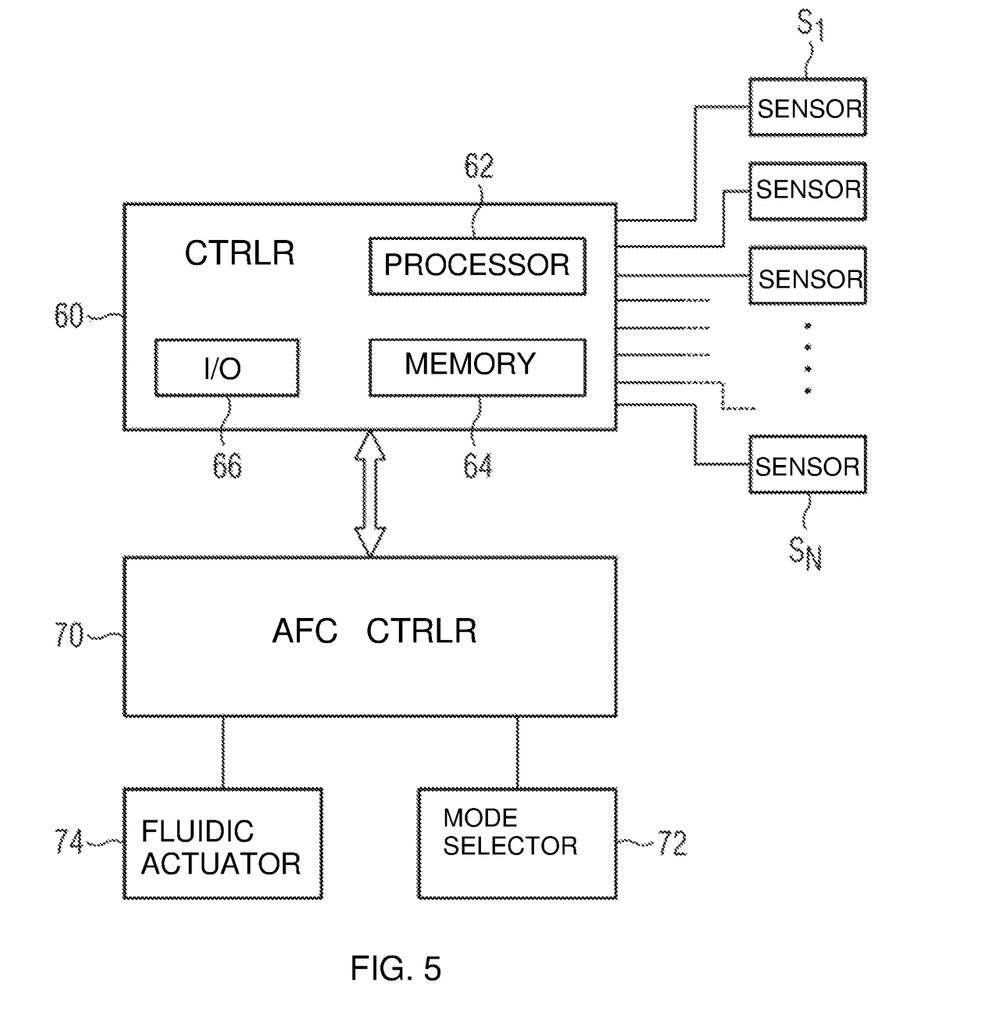
FIG. 5 is a block diagram showing a control system according to an embodiment of the invention.

FIG. 5 is a block diagram showing a control system according to an embodiment of the invention. A controller 60, which may be the aircraft's main controller or a subcontroller, comprises a processor 62, a computer memory 64, in which is stored a control program, and an input/output (I/O) portion 66. The control program may be software based, firmware based or a combination thereof. The control program includes a program portion for computing angle of attack. A software or firmware program for the controller may be stored on a computer program product. The computer program product may include a computer readable storage medium having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The controller 60 may incorporate a computer memory device which may be, for example, but is not limited to, an electronic storage device, a magnetic storage device, an optical storage device, an electromagnetic storage device, a semiconductor storage device, or any suitable combination of the foregoing. A non-exhaustive list of more specific examples of a computer memory device includes the following: a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing.

The controller 60 is connected to receive sensor signals from respective sensors S1 to SN via respective sensor signal lines, which may be physical connections, e.g., conductive wires or optical cable, or wireless. The controller 60 is connected to another controller, namely an AFC controller 70, which is responsible for controlling the AFCs both in respect of changing modes via an AFC mode selector 72 and actuating the AFCs to create fluid flow via an AFC fluidic actuator 74. The AFC mode selector 72 includes drive electronics connected to an electric motor for rotating the spindle 30. The AFC fluidic actuator includes drive electronics connected to a compressor for generating compressed air and urging the compressed air into the fluid chamber 26. The compressed air may be supplied in various actuation modes, for example at constant pressure or in pressure pulses, as described in more detail in relation to FIG. 8, FIG. 9 and supporting texts of U.S. Pat. No. 8,336,828 B2, or FIG. 16 and supporting text of U.S. Pat. No. 9,120,563 B2, the contents of both of which patent documents are incorporated herein by reference.

Figure 6:
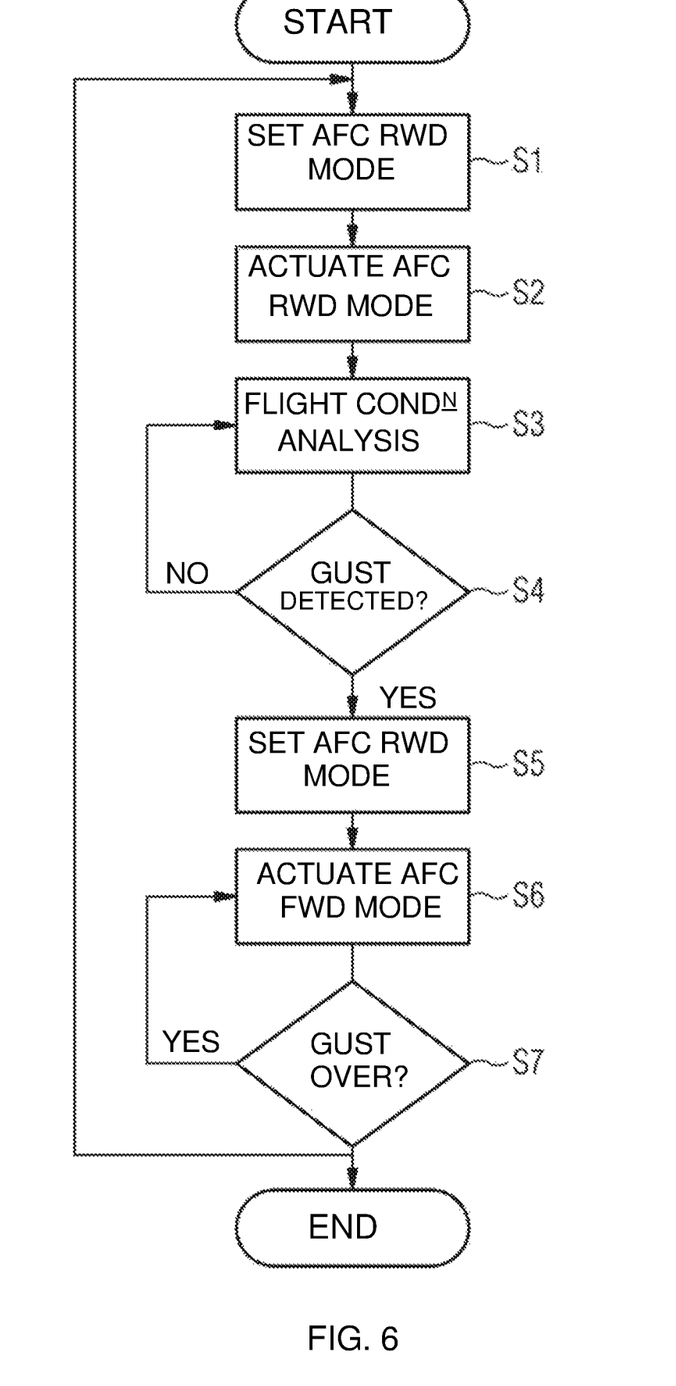
FIG. 6 is a flow diagram showing a method of deploying an embodiment of the invention.

FIG. 6 is a flow diagram showing a method of deploying an embodiment of the invention. The flow diagram shows the functional steps of the process flow implemented by the control program in the controller 60. After start of the process, at Step S1, the AFC device(s) are set into the rearward mode by the AFC mode selector 72. At Step S2, the disruptive air flow is then initiated by the fluidic actuator 74. At Step S3, flight conditions are analyzed at the controller 60 to predict whether an extreme wing load is about to occur. (This step is preferably carried out continuously and may be initiated at the start. It is merely shown at this point for ease of explanation.) Decision Step S4 acts so that if no extreme event (referred to as GUST in the flow diagram) is detected, the system continues its monitoring during the rearward mode, but if an extreme event is detected, Step S4 passes control to Step S5. In Step S5, the mode is switched by the AFC mode selector 72 to the forward mode optionally in combination with deactivating the fluid flow via the fluidic actuator 74. In Step S6, the fluidic actuator 74 then initiates appropriate fluid flow for the forward mode. Here it is to be expected that lift will be reduced and conditions for a dynamic stall may be created. At Decision Step S7, it is monitored whether the extreme event has ceased (referred to as GUST OVER in the flow diagram). Until the extreme event has ceased, the forward mode is continued with. Once the extreme event has ceased, process flow returns to the start, and the rearward mode is reset.

It will be appreciated that in normal operation, the rearward mode will be activated and deactivated independently as desired, whereas the forward mode will be activated in reaction to detection of an extreme event being imminent. In other words, the forward mode may be initiated from the inactive mode. Moreover, it may be the case that testing shows that the combined mode is more effective for ameliorating the effects of certain kinds of extreme events, so extreme event detection may cause the control program to trigger either the combined mode or the forward mode depending on the sensor inputs.

It is noted that the AFC device 25 of the first embodiment is based on that of U.S. Pat. No. 9,120,563 B2, and that we refer to this patent for further details of this design and its variations, materials options, actuation options and so forth, the relevant contents of which are incorporated herein by reference.

Having now completed a description of one embodiment, we now disclose some alternative embodiments for the mechanical construction of the AFC device 25. It will be appreciated that the above description of elements that are not specific to the mechanical construction or arrangement of the AFC device 25 applies also to these alternative embodiments. In particular, the control diagram of FIG. 5 and the process flow of FIG. 6 are generic to all the mechanical constructions disclosed herein.

Figure 7A:
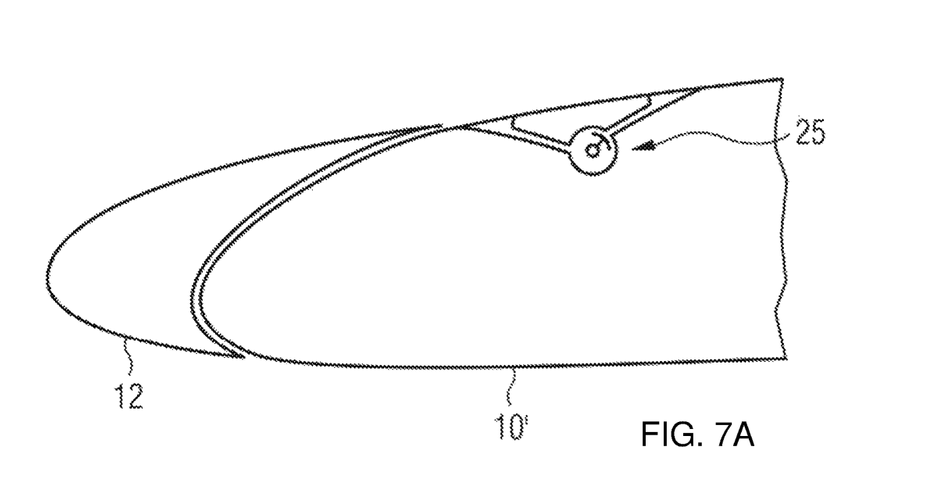
FIG. 7A is a partial section through an aircraft wing showing aspects of the mechanical structure of an active flow control device according to a second embodiment of the invention.
Figure 7B:
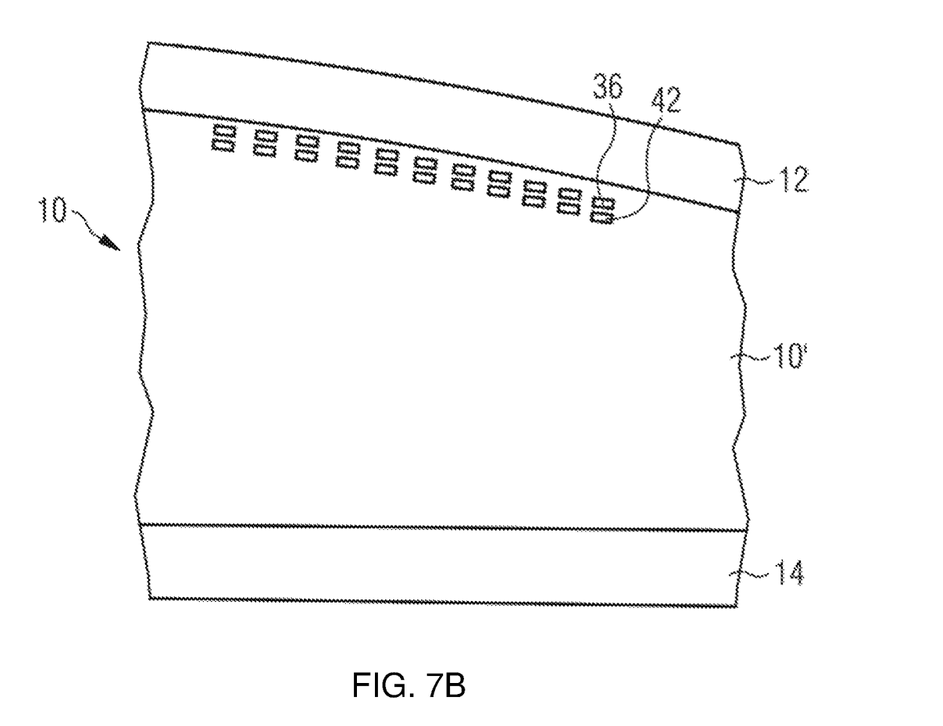
FIG. 7B is a partial plan view onto the wing of FIG. 7A.

FIG. 7A is a partial section through an aircraft wing showing mechanical structure of an active flow control device 25 according to a second embodiment of the invention. FIG. 7B is a partial plan view onto the wing of FIG. 7A. FIGS. 7A and 7B will be readily understood by comparison with FIGS. 4A and 4C. Namely, the second embodiment differs only from the first embodiment in that the AFC device 25 is arranged, not in the slat 12, but in the wing main portion 10' towards its leading edge, i.e., adjacent the slat displaced in the streamwise direction, so that the outlet ports 36, 42 are in the upper skin (i.e., surface) of the wing main portion 10'.

Figure 8A:
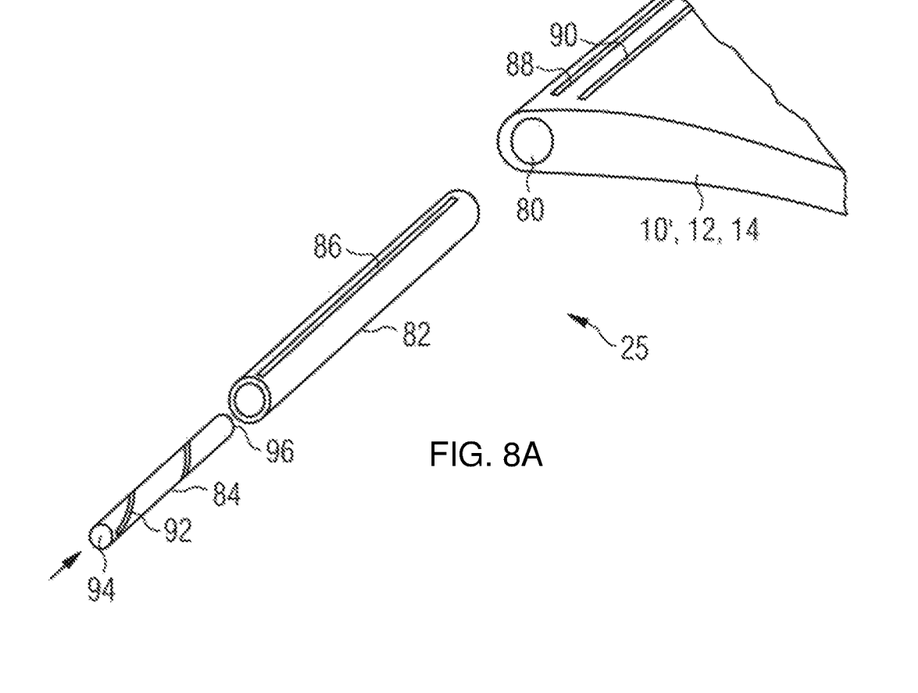
FIG. 8A is a schematic perspective view through an aircraft wing or wing slat showing aspects of the mechanical structure of an active flow control device according to a third embodiment of the invention.

FIG. 8A is a schematic perspective view through an aircraft main wing part 10', wing slat 12, or flap 14 showing mechanical structure of an AFC device 25 according to a third embodiment of the invention. In the following, we refer to the AFC device 25 being incorporated into the wing slat 12, whereas it will be understood that an alternative construction is within the wing main portion 10' or within the flap 14. The wing slat 12 has therein a cylindrical acceptance hole 80 extending in the span direction which is shaped and dimensioned to receive an outer hollow tubular sleeve 82 which in turn in shaped and dimensioned to receive an inner hollow tubular sleeve 84 which has a blind distal end 96 and an open proximal end 94, wherein the terms 'proximal' and 'distal' are in relation to the fuselage (or wing root). The sleeves 82 and 84 are rotatable with respect to each other and the acceptance hole 80. The outer sleeve 82 has partway along its length, and along a major portion of its length, an elongate straight slot 86. The wing main portion 10' also has forward and rearward straight wing slots 88 and 90 which extend parallel to each other, but offset in the streamwise direction and constitute respective forward and rearward outlet channels, analogous to those of the first embodiment. The outer sleeve 82 is rotatable relative to the acceptance hole 80 so that its slot 86 can align either with the forward wing slot 88 or the rearward wing slot 90. The outer sleeve 82 therefore performs the function of a valve analogous to the valve assembly 28 of the first embodiment. The inner sleeve has a helical slot 92. When the inner sleeve 84 is installed in the outer sleeve 82, there are thus a succession of axial length portions at which intersections occur between the helical slot 92 and the straight slot 86, so that when the inner sleeve 84 contains fluid at elevated pressure it will be emitted from these intersections and out of either the wing slot 88 or 90, depending on with which of these the straight slot in the outer sleeve is rotationally aligned. (Alternatively, there may be no such alignment in which case the flow channel to the wing upper surface is blocked.) It will be understood that the frequency and axial length of the intersections will depend on the periodicity, i.e., tightness of winding, of the helix and the width of the helical slot 92 in relation to the width of the straight slot 86. To operate the AFC device 25 of the third embodiment, air will be supplied at elevated pressure through the open proximal end 94 of the inner sleeve 84, while the inner sleeve 84 is being driven to rotate about its own axis by a suitable motor (not shown) such as an electric motor, and when the slot 86 is aligned with either slot 88 or 90. Compressed air will then emerge from axially moving length portions of the slot 88 or 90, as the points of intersection move with the spinning of the inner sleeve 84.

Figure 8B:
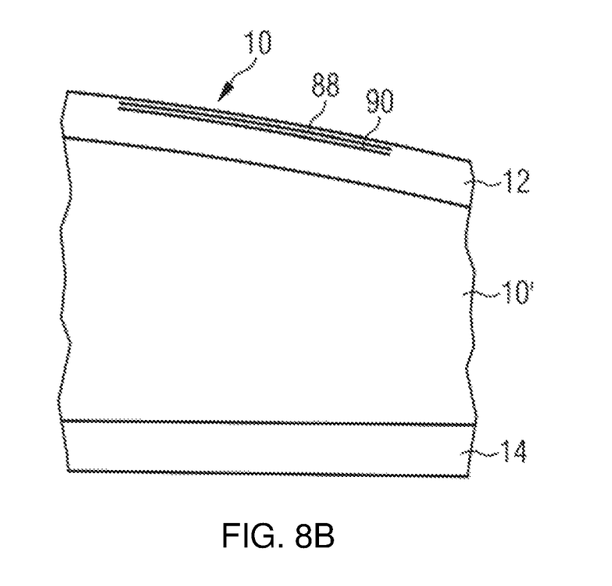
FIG. 8B is a partial plan view onto a wing according to FIG. 8A.

FIG. 8B is a partial plan view onto a wing according to FIG. 8A for the implementation wherein the AFC device 25 is incorporated in the slat 12.

Figure 8C:
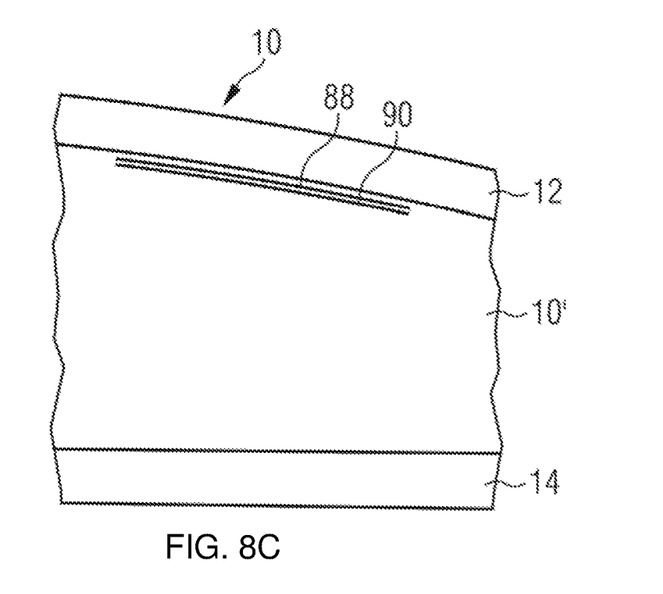
FIG. 8C is a partial plan view onto a wing slat of FIG. 8A.

FIG. 8C is a partial plan view onto a wing slat of FIG. 8A for the implementation wherein the AFC device 25 is incorporated in the main wing part 10'.

Figure 8D:
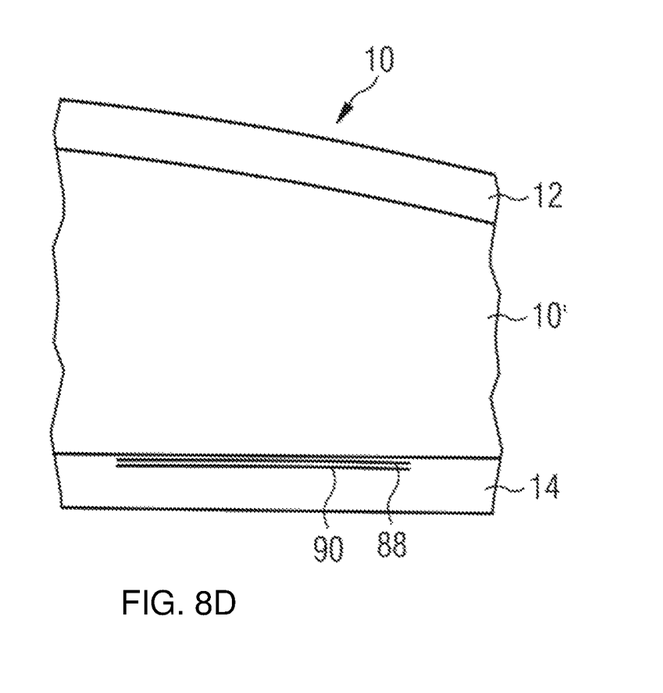
FIG. 8D is a partial plan view onto a wing slat of FIG. 8A.

FIG. 8D is a partial plan view onto a wing flap of FIG. 8A for the implementation wherein the AFC device 25 is incorporated in the flap 14.

It is noted that the AFC device 25 of the third embodiment is based on that of U.S. Pat. No. 8,336,828 B2, and that we refer to this patent for further details of this design and its variations, materials options, actuation options and so forth, the relevant contents of which are incorporated herein by reference.

In summary of the above embodiment, there has been described an AFC device 25 for an aircraft wing. The AFC device 25 comprises a fluid chamber 26 housed in the wing providing a conduit for receiving fluid and accommodating the fluid at elevated pressure. Forward and rearward fluid channels 32 and 38 having respective inlets 34 and 40 and outlets 36 and 42 are also provided, wherein the inlets are in fluid communication with the fluid chamber and the outlets emerge on the upper surface of the wing at or adjacent the leading edge. A valve assembly 28 allows the channels to be opened and closed as desired. During flight, fluid at elevated pressure can be supplied to the fluid chamber and released through either the forward or the rearward fluid channel or both, so as to influence the air flow, e.g., to reduce or increase lift, or to equalize pressure in the air stream direction.

Further embodiments of the invention can be envisaged as variants of the first, second or third embodiments in which only the forward channel 32 is provided and the rearward channel 38 is dispensed with. In these variants, the valve assembly 28 may also be dispensed with, or alternatively the valve assembly 28 could be retained to allow switching between the inactive mode and the forward mode.

Still further embodiments of the invention can be envisaged in which a bi-directional AFC device, i.e., one with a forward channel 32 and a rearward channel 38, is incorporated in a flap 14.

It will also be understood that an AFC device according to the invention may also be installed in a horizontal stabilizer, so references to wing should more generally be interpreted to cover any aerodynamic structure of streamlined cross-section which produces lift when exposed to fluid flow in the stream direction. It is also noted that installation of the AFC device in the slat has practical construction advantages, since it is not only a convenient location for integration, but may also share services, such as electrical supply lines, and/or be co-located with the de-icing system. Installation of the AFC device in the flap may have similar practical construction advantages, since it may be able to share services with other devices integrated in the flap. It is further noted that the AFC devices are preferably kept away from the ailerons to avoid interference with the aileron functions. It is still further noted that AFC devices as described herein are referred to in the art as jet actuators, sweeping jet actuators or micro-jets. Moreover, it is preferable to locate the AFC devices relatively far along the wings, i.e., towards the end distal from the fuselage, for maximum effect.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing having an upper surface, a lower surface, a leading edge and a trailing edge, the wing incorporating an active flow control device comprising:
    a fluid chamber housed in the wing providing a conduit for receiving fluid and accommodating the fluid at elevated pressure; and
    a fluid channel having an inlet in fluid communication with the fluid chamber and an outlet on the upper surface of the wing arranged at or adjacent the leading edge, so that during flight, fluid at elevated pressure can be supplied to the fluid chamber and released through the fluid channel, so as to reduce lift,
    wherein the active flow control device further comprises a valve assembly switchable to enable or block fluid communication between the fluid chamber and the fluid channel,
    wherein said fluid channel is a first fluid channel, wherein the active flow control device further comprises a second fluid channel having an inlet in fluid communication with the fluid chamber and an outlet on the upper surface of the wing arranged at or adjacent the leading edge and aft of the outlet of the first fluid channel, and wherein said valve assembly is switchable between a first state in which fluid communication between the fluid chamber and the first fluid channel is enabled and fluid communication between the fluid chamber and the second fluid channel is blocked and a second state in which fluid communication between the fluid chamber and the second fluid channel is enabled and fluid communication between the fluid chamber and the first fluid channel is blocked, so that during flight, fluid at elevated pressure can be selectively released through either the first fluid channel or the second fluid channel.

2. The aircraft wing of claim 1, wherein the valve assembly additionally is switchable to a further state in which fluid communication between the fluid chamber and both of the first and second fluid channels is blocked.

3. The aircraft wing of claim 1, wherein the valve assembly additionally is switchable to a still further state in which fluid communication between the fluid chamber and both of the first and second fluid channels is enabled.

4. The aircraft wing of claim 1, wherein the wing structure includes a slat and a main wing part, and the active flow control device is incorporated in at least one of the slat and the main wing part.

5. The aircraft wing of claim 1, wherein the leading and trailing edges are separated along any given line in the stream direction by a chord length, and at or adjacent the leading edge shall mean within at least one of 5, 10, 15, 20, 25 or 30 percent of the chord length.

6. An aircraft comprising a plurality of aircraft wings according to claim 1 in combination with a control system for actuating the active flow control devices, the control system comprising:
    a controller hosting a control program operable to detect extreme events; and
    a plurality of sensors operatively connected to the controller to supply time-varying sensed parameter values to the controller,
    wherein extreme events are detected based on analysis of the time-varying sensed parameter values and wherein, upon detection of an extreme event, the controller is operable to actuate the active flow control devices by causing fluid at elevated pressure to be supplied to the fluid chambers and released through the fluid channels, so as to reduce lift.

7. An aircraft wing having an upper surface, a lower surface, a leading edge and a trailing edge, the wing incorporating an active flow control device comprising:
    a fluid chamber housed in the wing providing a conduit for receiving fluid and accommodating the fluid at elevated pressure;
    a first fluid channel having an inlet in fluid communication with the fluid chamber and an outlet on the upper surface of the wing, so that during flight, fluid at elevated pressure can be supplied to the fluid chamber and released through the fluid channel, so as to reduce lift;
    a second fluid channel having an inlet in fluid communication with the fluid chamber and an outlet on the upper surface of the wing structure arranged aft of the outlet of the first fluid channel; and
    a valve assembly switchable between a first state in which fluid communication between the fluid chamber and the first fluid channel is enabled and fluid communication between the fluid chamber and the second fluid channel is blocked and a second state in which fluid communication between the fluid chamber and the second fluid channel is enabled and fluid communication between the fluid chamber and the first fluid channel is blocked, so that during flight, fluid at elevated pressure can be selectively released through either the first fluid channel or the second fluid channel.

8. The aircraft wing of claim 7, wherein the valve assembly additionally is switchable to a further state in which fluid communication between the fluid chamber and both of the first and second fluid channels is blocked.

9. The aircraft wing of claim 7, wherein the valve assembly additionally is switchable to a still further state in which fluid communication between the fluid chamber and both of the first and second fluid channels is enabled.

10. The aircraft wing of claim 7, wherein the wing structure includes a slat, a main wing part and a flap, and the active flow control device is incorporated in at least one of the slat, the main wing part and the flap.

11. An aircraft comprising a plurality of aircraft wings according to claim 7 in combination with a control system for actuating the active flow control devices, the control system comprising:
    a controller hosting a control program operable to detect extreme events; and
    a plurality of sensors operatively connected to the controller to supply time-varying sensed parameter values to the controller,
    wherein the controller is operable to actuate the active flow control devices by causing fluid at elevated pressure to be supplied to the fluid chambers and released through at least one of the first fluid channels and the second fluid channels.

* * * * *